Sept. 9, 1958 G. G. GRINEFF 2,850,943
SELF-SUPPORTING LENS HOLDERS
Filed April 26, 1954

*INVENTOR.*
GEORGE G. GRINEFF
BY C. E. Beach
ATTORNEY.

United States Patent Office

2,850,943
Patented Sept. 9, 1958

2,850,943

SELF-SUPPORTING LENS HOLDERS

George G. Grineff, Vestal, N. Y.

Application April 26, 1954, Serial No. 425,440

1 Claim. (Cl. 88—39)

This invention relates to self-supporting lens holders, and, particularly, to lens holders for use by toolmakers and others having frequent occasion to read, with extreme accuracy, indications of vernier precision instruments such as, for example, protractors, height gauges and calipers.

In the use of such instruments, there are frequent instances in which there is occasion for accurately both observing and recording a series of readings. In such instances, it has been found undesirable to use hand lenses, principally for reasons such as that it wastes the user's time to have to find and pick up the hand lens and hold it in correct positioning for each reading, and that, one hand of the user being needed for recording the readings, the remaining hand cannot hold the lens and instrument in suitable relation to one another, and, at the same time, in positioning facilitating accurate reading of the scale of the instrument by the user.

In efforts to meet these difficulties, lens holders have been devised which embody facilities for clamping them to the instruments to be read, and for adjusting them to obtain suitable focusing of the lenses with reference to the scales of such instruments.

Use of lens holders of such clamp-on types has been found to present a number of objectionable features, prominent among which are that placing them upon and removal from instruments frequently causes inadvertent alterations of settings. Furthermore, if there is occasion for using a given holder successively upon a height gauge, an external caliper, a depth gauge, an internal caliper and a protractor, attaching, adjusting and focusing such holders for one after another of the instruments will delay the user to an objectionable extent.

Inasmuch as such users of lenses frequently work in situations where the light reaching the scales to be read comes from the far side of the scales, it is important that structures of any holders so used shall be of a form such as will not cast an objectionable shadow upon such scales.

In view of the foregoing, it is an important object of this invention to provide a lens holder which can be instantly applied and will thereafter adequately adhere to one and another of a wide variety of instruments.

It is another object to provide a lens holder which can be applied to or removed after use from intended instruments without tending to cause alterations in settings of such instruments.

It is a further object to provide a lens holder which will not require revision of focusing or other adjustment incident to use upon one instrument or another.

A still further object is to provide a lens holder of form such that it will cause a minimum of obstruction to light coming from the far side of the scale to be read.

Other objects include provision of a lens holder which is compact, of minimum weight, durable, and susceptible of inexpensive manufacture.

An embodiment of this invention is shown in the accompanying drawing, in which.

Figure 1:
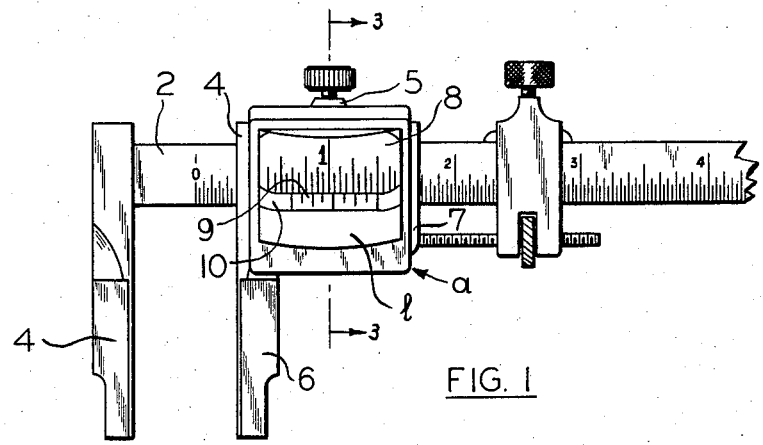
Figure 1 is a plan view of a lens holder embodying this invention, here shown as applied to a conventional form of external caliper.
Figure 2:
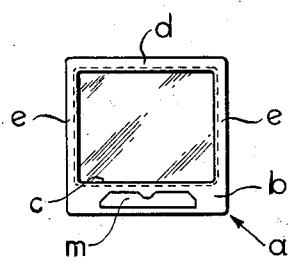
Fig. 2 is a plan view of the holder of Fig. 1, looking upward in a plane parallel with the rear surface of the front wall.

The embodiment of this invention shown in the drawing comprises a body structure $a$ in which a permanent magnet $m$ (hereinafter sometimes referred to as "magnetic means") is embedded, and which supports a magnifying lens $l$.

Said body structure should be formed of a suitable substance such, for example, as a molded material which is sometimes designated as "General Purpose Plastic." Said body structure has a planar base surface $b$, a wall portion $c$ which rises above the side of the surface $b$ ordinarily nearest the observer during use, and a rectangular frame or casing $d$ suited for supporting an intended lens and which extends away from the user from the upper edge of said wall.

As shown, said wall portion $c$ inclines toward the user from normal to the surface of said base surface $b$, to an extent on the order of 24°, both for the purpose of facilitating observation of scales of instruments to which the holder may be applied and for minimizing obstruction to light which should reach such scale.

Brackets $e$, $e$ are carried by edges of the wall $c$ for supporting the casing $d$, and the four walls of said casing surround an opening through which scales and verniers of associated instruments may be viewed.

Shoulders $s$, $s$ are provided in at least two of opposing ones of the side walls of the casing $d$ for supporting the lens $l$ at a suitable height above and with its principal planes tilted relative to the surface $b$ so that the edge of the lens opposite the wall portion $c$ is tilted furthest away from the surface $b$. The side walls are susceptible of springing slightly apart when said lens is being inserted therebetween. Said shoulders and/or the portions of said side walls extending above them may be coated with a suitable cement for assuring retention of the lens in intended positioning.

Figure 4:
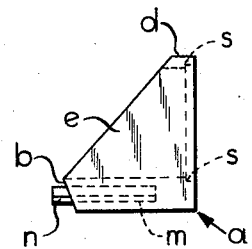
Fig. 4 is a side elevational view of the body of a holder such as that of Figs. 1, 2 and 3, showing a portion of the permanent magnet as it projects from such body when it is first removed from the mold, and before the projecting end of the magnet has been cut off to conform with the base surface.

For the purpose of assuring suitable positioning of the magnet $m$ with reference to the longitudinal sides of the wall $c$, the mold in which the body $a$ is formed has a cavity for receiving an end $n$ of said magnet. Hence, said end will project from the base surface $b$, as shown in Fig. 4, when said body is removed from the mold.

After such bodies have been removed from the mold, these projecting ends are removed, and the end or pole of each magnet is dressed off parallel to and substantially flush with the base surface $b$.

Figure 3:
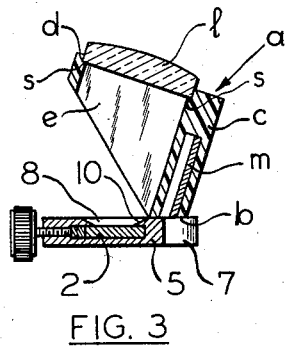
Fig. 3 is a cross-sectional view taken on the line 3—3 of Fig. 1.

The lens $l$ is of a character such that, when it is resting on said shoulders, and the holder is applied to an instrument in a manner such as indicated in Figs. 1 and 3, said lens will render the graduations of the scale and vernier of such instrument clearly readable when observed therethrough.

It should be understood that the conventional caliper of Figs. 1 and 3 is shown merely as illustrative of various uses of this holder. It will be evident that this holder can be correspondingly applied to other forms of calipers and to various gauges and protractors, or other paramagnetic supports.

Calipers of the conventional type here shown have a blade 2, marked with usual graduations, and which carries at one end thereof the jaw 4. A movable structure 5 carries another jaw 6, and comprises a head 7 through which the blade 2 passes.

An opening 8 through the head 7 provides opportunity for viewing certain of the graduations on the blade 2, as well as the vernier graduations 9 provided along the wall 10 at the edge of said opening for cooperation with the graduations of the blade 2.

In use, the holder should be placed upon a desired instrument in positioning such as will render visible, through the frame, a suitable portion of the graduations of the blade 2 and those of the vernier 9; magnifications of which graduations may then be observed through the lens $l$.

When not in use, the holder may be placed upon, and will adhere to, any available suitable surface, such as a steel lamp shade, pipe or other object.

From the foregoing, it will be evident that a holder constructed in accordance with this invention can be instantly applied and will thereafter effectively adhere to one and another of a wide variety of instruments, and that it can be applied to or removed from such instruments without causing alterations of settings.

It will also be evident that this holder does not require focusing or other adjustment incident to use upon one instrument or another, and that it does not objectionably obstruct light coming from the far side of the scale to be read; also that this holder is compact, of minimum weight, durable, and susceptible of inexpensive manufacture.

Having described this invention, I claim:

A magnifying device for forming enlarged virtual images of scale readings on instruments such as height guages, calipers, protractors and the like, having a paramagnetic surface adjacent to such scale readings, said device comprising a magnifying lens, and a holder for holding said lens in fixed spaced relation to such surface, said holder comprising a casing for securing the edges of said lens, a wall member depending from said casing, the plane of said lens being substantially at right angles to said wall member, the lower end of said wall member terminating in a flat base surface suitable for placement on a magnetizable portion of the said instruments having a scale to be viewed, said flat base surface being inclined to said wall member such that the normal to the flat base surface is at an angle of about 20 degrees from the plane of the said wall member, and a permanent magnet embedded in said wall member and having a pole thereof substantially coplanar with said base surface for magnetic attachment to such para-magnetic surface so as to hold said device in operating position on such para-magnetic surface.

References Cited in the file of this patent

UNITED STATES PATENTS

| 210,068 | Thompson | Nov. 19, 1878 |
| 803,435 | Saegmuller | Oct. 31, 1905 |
| 1,755,759 | Ahmels | Apr. 22, 1930 |
| 2,147,482 | Butler | Feb. 14, 1939 |
| 2,217,514 | Henry | Oct. 8, 1940 |
| 2,254,498 | Scharf | Sept. 2, 1941 |
| 2,453,064 | Cressaty | Nov. 2, 1948 |
| 2,613,104 | Parsons | Oct. 7, 1952 |
| 2,651,235 | Barrows | Sept. 8, 1953 |

FOREIGN PATENTS

| 791,885 | France | Oct. 7, 1935 |
| 915,421 | France | Nov. 6, 1946 |